Figure 1:
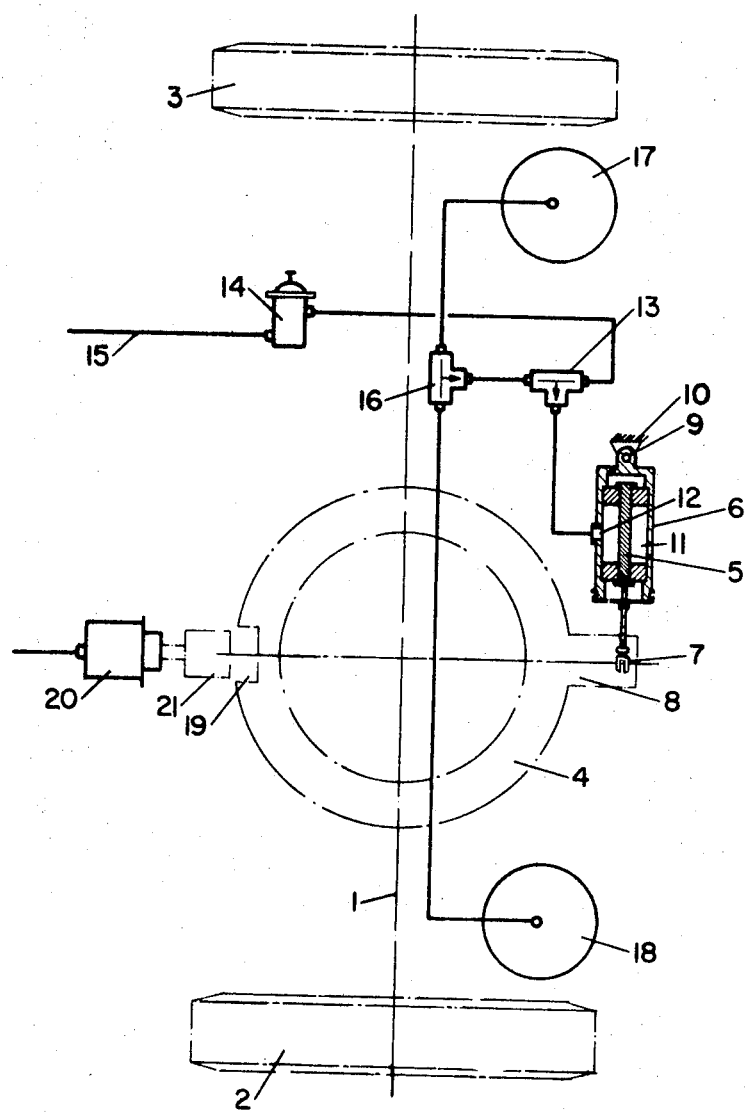

United States Patent

[11] 3,583,515

[72] Inventor Horst Schwenk
 Hannover, Germany
[21] Appl. No. 802,543
[22] Filed Feb. 26, 1969
[45] Patented June 8, 1971
[73] Assignee Westinghouse Bremsen-Und Apparate-bau G.m.b.H.
 Hannover, Germany
[32] Priority Mar. 20, 1968
[33] Germany
[31] W41905/63c

[54] LOAD-COMPENSATED VEHICLE STEERING WHEEL APPARATUS
 5 Claims, 2 Drawing Figs.
[52] U.S. Cl.......................................... 180/79.2,
 92/75, 280/94, 280/124
[51] Int. Cl...................................................... B62d 5/10

[50] Field of Search.......................................... 280/94, 97,
 80, 124 F; 180/79.2, 79.2 A, 79.2 B; 92/65, 75

[56] References Cited
UNITED STATES PATENTS
2,649,842  8/1953  Caldwell et al. ............... 92/65X
2,885,021  5/1959  Routledge ..................... 180/79.2(B)
3,212,793  10/1965 Pietroroia...................... 180/79.2X

*Primary Examiner*—A. Harry Levy
*Attorneys*—Adelbert A. Steinmiller and Ralph W. McIntire, Jr ABSTRACT: Load-compensated vehicle steering wheel recentering apparatus in which a double-acting fluid pressure operated cylinder is continuously communicated with a fluid pressure source comprised of a reservoir or the pressure in the vehicle air spring mechanism, whichever pressure is greater, to automatically recenter the steering mechanism upon removal of the overriding force moving the lever offcenter in either of two opposite directions.

INVENTOR
HORST SCHWENK
BY Ralph W. McIntire, Jr.
ATTORNEY 3,583,515

LOAD-COMPENSATED VEHICLE STEERING WHEEL APPARATUS

BACKGROUND OF INVENTION

Heretofore, it has been proposed to provide a load-compensated steering-mechanism-recentering device comprised of a single cylinder having the piston rod connected to one end of a lever, the other end of which lever included a sliding surface pressed in a load dependency manner into an obtusely angled recess in a segment piece attached to a steering ring, with the attendant disadvantage that the sliding surface and the segment piece were subjected to heavy wear.

SUMMARY OF THE INVENTION

It is the object of the present invention to provide a single load compensated cylinder device to automatically recenter a vehicle steering axle upon removal of the force moving the axle offcenter in either of two opposite directions.

In the present invention, this object is achieved by providing a cylinder device having one end of the cylinder attached to the vehicle frame and the piston rod extending from the other end attached to provide leverage to the steering mechanism. In the cylinder, a pair of pistons are axially slidable, in a sealed manner, on the piston rod between a pair of spaced followers, each piston engageable with a corresponding one of a pair of spaced shoulders or stops on the interior of the cylinder. The space between the pistons serves as a compression chamber continuously supplied with fluid-regulated pressure connected to one supply port or input of a double check valve, and fluid under pressure variable in accordance with vehicle load as provided by the pressure in the air springs connected to the other supply port or input so that the loaded condition of the vehicle will provide a proportionate return force to the cylinder compression chamber, while the regulated pressure will provide the pressure in the cylinder compression chamber required to return the steering mechanism for the unloaded condition of the vehicle.

The present invention is particularly useful in vehicle steering mechanism, but can be utilized in the same fashion to automatically recenter any device movable offcenter in either of two opposite directions, as for example, to realign the coupler mechanism relative the longitudinal axis of a railway car body.

Figure 2:
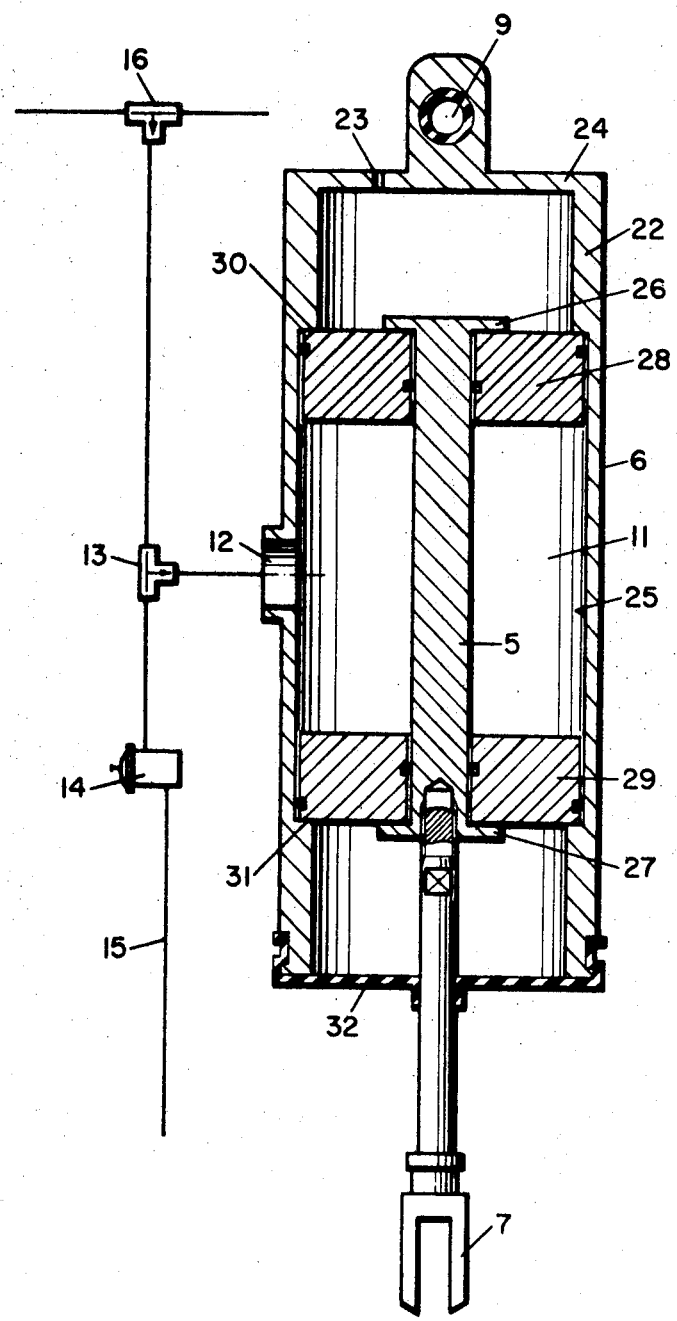

This and other objectives will be more readily understood in the following description, taken with the drawings, in which:

FIG. 1 is a sectional view of the recentering apparatus of the invention, shown in association with a conventional vehicle steering mechanism, and FIG. 2 is another sectional view, on an enlarged scale, of the cylinder device of the recentering apparatus.

Referring now to FIG. 1 of the drawing, there is shown a steering axle 1 having associated wheels 2, 3 and a steering circle upper ring 4, all of conventional construction and shown in phantom lines.

The piston rod 5 of the cylinder 6 is power connected by way of a forked head 7 to a projection 8 of the steering circle upper ring 4.

The pneumatic cylinder 6 is supported by means of an eye 9 attached in a pivotal manner to bracket 10 of the vehicle frame, not shown.

The pressure chamber 11 of the pneumatic cylinder 6 is connected by way of port 12, the output or delivery port of double check valve 13, and one input of the double check valve to a pressure-reducing valve 14 which is connected by piping 15 to a fluid supply source, not shown. The pressure chamber 11 is also connected through the other input of the double check valve 13 and the output of a second double check valve 16 to two of the air spring bellows, each bellows connected to a different one of the two inputs of check valve 16.

In the side of steering ring 4 opposite projection 8 there is disposed a recess 19 into and out of which a fluid pressure operated cylinder 20 moves a return travel lock 21, shown in phantom outline.

Referring now to FIG. 2, it is seen that the cylinder 6 consists of the cylinder tubing 22 which is closed at one end by way of cylinder base 24 having an exhaust opening 23 therein. The eye 9 is attached to the cylinder base 24 for the purpose of pivotal attachment to the vehicle frame. In the cylinder bore 25 there are disposed two pistons 28, 29 arranged in an axially movable sealed manner relative to the cylinder bore, and which are penetrated in a sealed manner by the piston rod 5 axially movable relative thereto and having disposed thereon a pair of axially spaced followers 26, 27.

The radial projections 30, 31 near each end of the cylinder bore 15 form stops for the respective pistons 28, 29.

The permissible travel for the piston rod 5 is limited by means of appropriate mechanical projections, not shown, on the steering axle for limiting the maximum angle of turn in order to prevent excessive stress upon cylinder 6.

In now describing the operation of the invention it will be observed that the steering axle 1, with the wheels 2, 3, is arranged in a rotatable manner by the means of the steering circle upper ring 4. The pressure chamber 11 of cylinder 6 is constantly subjected to air under pressure as supplied by either the separate pressure source, not shown, or the higher pressure of either of the air springs 17, 18 so that the forked head 7 of piston rod 5 which engages projection 8 of the steering circle upper ring 4 to effect wheel travel, is held in its center position, as shown in both FIGS. 1 and 2 of the drawing.

In the center position, pistons 28 and 29 abut the respective projections 30 and 31 and hold the piston rod 5 securely in its center position by engagement with the respective followers 26 and 27.

If now forces are applied which rotate the steering axle 1 out of the center position, for an example in counterclockwise offcenter movement, follower 27 carries piston 29 in an upward direction in overriding opposition to the fluid force that is exerted against the upper circular area of the piston 29 as provided by the pressure existing in the chamber 11.

If the forces that served to rotate the steering axle 1 now cease, the piston 29 once again is pressed against its projection 31 by the now unopposed pressure in chamber 11, thereby returning the follower 27, piston rod 5, forked head 7 and the steering axle 1 to the center position, as shown.

When the vehicle is unloaded, the pressure in the air spring bellows 17, 18 is less than the pressure behind the pressure-reducing valve 14. Accordingly, the double check valve 13 is now positioned so that pressure chamber 11 is communicated with the pressure reducer 14. With increasing loading the pressure in the spring bellows 17, 18 is increased in load-dependent manner. As soon as the pressure in one of the spring bellows 17, 18 exceeds the regulated pressure provided by the pressure reducer 14, the double check valves 13 and 16 establish communication between the spring bellows 17 or 18, whichever has the higher pressure, and the pressure chamber 11, at the same time cutting off supply through the pressure-reducing valve.

Because of the load-dependent manner in which the pressure in chamber 11 is controlled, the magnitude of the return force exerted by the pneumatic cylinder 11 on the steering axle, after cessation of the turning force which moved the axle offcenter, as for example on vehicle travel around a curve, is matched to the load condition.

Having now described the invention, what I claim as new and desire to secure by Letters Pat., is:

1. An automatic recentering apparatus for recentering a member movable offcenter in two different directions, comprising:
   a. a cylinder having a bore therein and means at one end for connection to a support;
   b. a piston rod in said cylinder extending through the opposite end thereof for connection to said member;
   c. a pair of pistons in said bore, each axially movable in a sealed manner on said piston rod;
   d. a pair of followers on said piston rod so disposed as to define the maximum distance between said pistons when each piston is engaged with a corresponding one of said followers;

e. a pair of axially spaced piston stop means in said bore, each engageable with a corresponding one of said pistons on the same side as the corresponding follower, said pair of stop means spaced apart a distance such that both pistons are engaged with the corresponding one of said pair of stop means and the corresponding one of said followers when said member is disposed in the center position, and f. port means in said cylinder for communicating fluid pressure with said bore between said pistons.

2. An automatic recentering apparatus, as recited in claim 1, in which said port means is communicable with a pressure-regulated source of fluid pressure.

3. A load-compensated recentering apparatus for use with steering apparatus on a vehicle having a frame supported on air spring means, the steering apparatus including a member movable offcenter in either of two opposing directions to turn the vehicle wheels in opposite directions relative to the center position, said load-compensated recentering device comprising:

a. a fluid-pressure-operated cylinder device having a bore therein and means on one end for attachment to the vehicle frame at a predetermined point relative said two opposing directions;

b. a piston rod in said cylinder and extending through the other end thereof for attachment to said member at a point, said predetermined point on said frame and said member relatively positioned as to substantially align the axis of said cylinder with said two opposing directions;

c. a pair of pistons in said bore, each axially movable in a sealed manner on said piston rod;

d. a pair of followers on said piston rod so disposed as to define the maximum distance between said pistons when each piston is engaged with a corresponding one of said followers;

e. a pair of axially spaced piston stop means in said bore, each engageable with a corresponding one of said pistons on the same side as the corresponding follower, said pair of stop means spaced apart a distance such that both pistons are engaged with the corresponding one of said pair of stop means and the corresponding one of said followers when said member is disposed in the center position;

f. port means in said cylinder for communicating fluid pressure with said bore between said pistons; and g. double check valve means including a delivery port communicating with said port means, a first supply port for communicating with a pressure-regulated source of fluid pressure supply, and a second supply port for communicating with said air spring means.

4. A load-compensated recentering apparatus, as recited in claim 3, further including a second double check valve device having a delivery port communicating with said second supply port of said double check valve means, and a pair of supply ports each communicable with a different one of a pair of air springs in said air spring means.

5. A load-compensated recentering apparatus for use with steering apparatus on a vehicle having a frame supported on air spring means, the steering apparatus including a member movable offcenter in either of two substantially opposing directions to turn the vehicle wheels in opposite directions relative to the center position, said load-compensated recentering device comprising:

a. a fluid-pressure-operated cylinder device having means on one end for attachment to the vehicle frame at a predetermined point, and having a piston rod therein extending through the other end thereof for attachment to said member at a predetermined point, b. said predetermined point on each of said frame and said member being disposed relative said substantially opposite directions to substantially align said cylinder device relative said substantially opposite directions;

c. port means in said cylinder device for communication with a continuous source of regulated fluid pressure;

d. piston means in said cylinder device cooperative with said cylinder device and said piston rod in response to said continuous pressure so as to return said piston rod from either a relatively retracted position or a relatively extended position to a predetermined center position, upon removal of a force on said member applied in either of said substantially opposite directions to override said continuous pressure; and e. means for communicating said port means with the pressure in said air spring means only so long as the pressure in said air spring means is greater than said continuous source of regulated fluid pressure.